United States Patent [19]
Schmidt et al.

[11] 3,993,942
[45] Nov. 23, 1976

[54] FORCED COMMUTATION CHOPPER HAVING CURRENT LIMIT

[75] Inventors: Harvey E. Schmidt, Chicago Heights, Ill.; Michael H. Grace, Griffith, Ind.; Howard G. Murphy, Greendale, Wis.

[73] Assignee: Allis-Chalmers Corporation, Milwaukee, Wis.

[22] Filed: Sept. 11, 1975

[21] Appl. No.: 612,537

[52] U.S. Cl. ............................... 318/317; 318/341; 318/345
[51] Int. Cl.² .......................................... H02P 7/06
[58] Field of Search ............ 318/345 C, 345 G, 139, 318/341, 317; 323/22 C

[56] References Cited
UNITED STATES PATENTS

| | | | |
|---|---|---|---|
| 3,373,331 | 3/1968 | Dow .............................. | 318/317 X |
| 3,551,774 | 12/1970 | Rusch ............................... | 318/341 |
| 3,899,041 | 8/1975 | Mager ............................ | 318/139 X |
| 3,936,711 | 2/1976 | Gay ................................ | 318/317 X |
| 3,944,900 | 3/1976 | Rohsler ............................. | 318/317 |

*Primary Examiner*—Benjamin Dobeck
*Attorney, Agent, or Firm*—Lee H. Kaiser

[57] ABSTRACT

A forced commutation chopper control for regulating speed of a DC series tractive motor limits peak motor current by sensing the voltage across the commutation capacitor during the on-time of the current pulses and gating the commutation SCR on in response to a predetermined magnitude of sensed voltage to thereby terminate current pulses to the motor.

4 Claims, 1 Drawing Figure

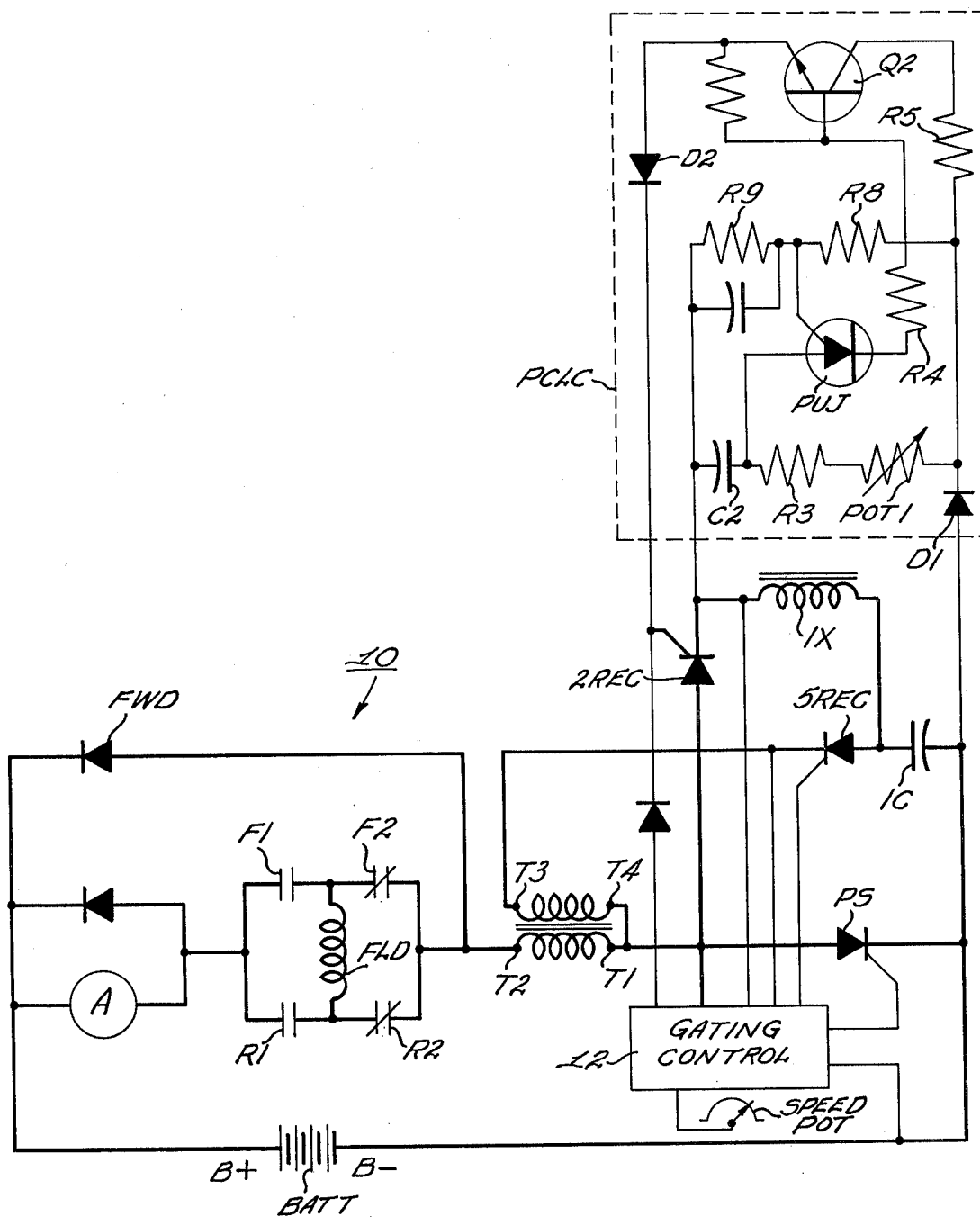

3,993,942

FORCED COMMUTATION CHOPPER HAVING CURRENT LIMIT

This invention relates to battery vehicle motorcontroller choppers using forced commutation and in particular to current limiting means for such a chopper.

BACKGROUND OF THE INVENTION

A well known method of controlling the voltage to, and thus the speed, of a battery-driven DC motor uses a rapidacting switch, called a chopper, in series with the motor. Such a chopper type motor drive may accomplish speed control by pulse width modulation to vary the average power input to the DC motor, i.e., by switching a solid state power device such as a silicon controlled rectifier (SCR) between the "on" state and the "off" state and controlling the percentage of "on" time. Other known chopper drives vary the frequency of constant width pulses to vary the average power to the motor. Many known chopper circuits interrupt the current through the load current carrying SCR by "forced commutation," the essence of which is to decrease the load current through the SCR to a value below the "hold-in" current for an interval greater than the "recovery period" of the SCR. Capacitor-type forced commutation chopper circuits charge a commutation capacitor in shunt to the main load current carrying SCR during the "on" time and gate a commutation SCR in the shunt path to discharge the commutation capacitor in the reverse direction through the load current carrying SCR to cause it to commutate off.

The current flowing through the tractive motor of known forced commutation chopper controls may become excessive during such conditions as start-up, acceleration, plugging or when the vehicle starts up an inclined ramp, and such excessive current may result in failure and accelerated wear of the motor brushes as well as overheating and eventual failure of the motor.

OBJECTS OF THE INVENTION

It is an object of the invention to provide a chopper motor drive of the forced commutation type which obviates the above disadvantages of prior art apparatus and at all times limits the peak current supplied to the motor. A further object is to provide such a battery vehicle motorcontroller chopper which inherently controls the average current supplied to the motor even during vehicle start-up, acceleration, ramping and plugging.

SUMMARY OF THE INVENTION

A battery vehicle, forced-commutation, motor-controller chopper embodying the invention has a main load current carrying SCR which is periodocally switched on and off at a rapid rate to vary the average power input to the motor; a commutation capacitor connected in shunt to the main SCR by a commutation SCR; means for charging the commutation capacitor during the on-time of the main SCR to a voltage which is a function of the magnitude of current through the main SCR and of a polarity tending to reverse bias the main SCR; and current limit means for sensing the voltage across the commutation capacitor during the on-time of the main SCR and being responsive to a predetermined magnitude of sensed voltage for gating the commutation SCR on to thereby commutate the main SCR off and terminate current pulses to the motor. In a preferred embodiment the sensed voltage signal is delayed in an RC circuit and then triggers a programmable unijunction transistor in the current limit circuit to gate the commutation SCR on and thereby turn off the main SCR.

DESCRIPTION OF THE DRAWING

The subject matter which we regard as our invention is set forth in the appended claims. The invention itself, however, together with further objects and advantages thereof may be understood by referring to the following detailed description when considered together with the accompanying drawing which is a schematic circuit diagram of a forced commutation, battery vehicle motor controller embodying one form of our invention.

DETAILED DESCRIPTION

Referring now to the drawing, a forced commutation, motor-controller chopper 10 selectively controls the speed of a DC traction series motor having an armature A and a field winding FLD by selectively varying the frequency of the current pulses periodically supplied thereto from a battery BATT through a main, or load current carrying, semiconductor controlled rectifier power switch PS, thereby selectively controlling the average power supplied to the motor. Armature A and field winding FLD may be connected in series with power switch PS and the primary winding T2-T1 of a transformer across the terminals of battery BATT through the normally open contacts F1 of a "forward" contactor and the normally closed contacts R2 of a "reverse" contactor to drive the vehicle in the forward direction, or may alternatively be connected through the normally open contacts R1 of the reverse contactor and the normally closed contacts F2 of the forward contactor to propel the vehicle to the rear. A free wheeling diode FWD in shunt to the series arrangement of motor armature A and field winding FLD provides a path for inductive motor current during the interpulse period when power switch PS is open.

The frequency of current pulses supplied by power switch PS to the motor may be selectively regulated by a gating control 12 shown in block form which applies gating pulses to the gate of power switch PS. Gating control 12 may include a relaxation oscillator (not shown) which generates the gating pulses and whose frequency is selectively controlled by the setting of a potentiometer SPEED POT on the vehicle. The series arrangement of a commutation capacitor 1C, an auxiliary thyristor 5 REC, and the transformer secondary winding T3-T4 may be connected in shunt to power switch PS. One side of an inductor 1X may be coupled to the junction between 5 REC and the commutation capacitor 1C, and the other side of inductor 1X may be connected to the cathode of a commutation thyristor 2 REC whose anode is coupled to the junction between transformer primary T2-T1 and the anode of power switch PS.

The duration of current pulses supplied by power switch PS is controlled by the time interval between each "on" gating pulse applied by gating control 12 to power switch PS and the "off" gating pulse subsequently applied to commutation SCR 2 REC to turn off the power switch. Although the duration of current pulses supplied by power switch PS to the motor is fixed in the disclosed embodiment, it will be appreciated that gating control 12 may, if desired, selectively control the width of the current pulses by varying the time delay between the gating pulses applied to power switch PS and to commutation SCR 2 REC.

The illustrated chopper is popularly known as the "Jones" Class D forced commutation chopper wherein a commutation capacitor is switched by an auxiliary SCR, i.e., 2 REC. Under normal operating conditions a gating pulse is applied to power switch PS each time the relaxation oscillator (not shown) of gating control 12 generates an output pulse, thereby turning on PS. Assuming the forward contactor is operated, a current pulse is applied from battery BATT to the motor when power switch PS conducts in a circuit which may be traced from battery terminal B+, armature A, contacts F1, field winding FLD, contacts R2, transformer primary T2-T1, and the anode-cathode circuit of power switch PS to battery terminal B−. The increase in magnitude of current flowing in transformer primary winding T2-T1 induces a voltage in secondary winding T4-T3 of such polarity that T3 is driven negative. The gate of auxiliary SCR 5 REC may be referenced to ground in gating control 12, and the negative potential at T3 is applied to the cathode of 5 REC to, in effect, supply a gating signal to 5 REC to turn it on. Conduction by 5 REC results in charging of commutation capacitor 1C from the potential induced in transformer secondary winding T3-T4 of a polarity tending to forward bias commutation SCR 2 REC and to reverse bias power switch PS. After commutation capacitor 1C is charged, the current flow through auxiliary SCR 5 REC falls below its hold-in current and it turns off. When the current through 5 REC and winding T3-T4 decays to zero, the magnetic field of the transformer collapses and induces a voltage in secondary winding T3-T4 which drives T3 positive. The positive polarity of voltage at terminal T3 may be "steered" by gating control 12 to the gate of commutation capacitor 2 REC to turn it on and thus initiate the commutation cycle.

Commutation of power switch PS is initiated when commutation capacitor 1C starts to conduct load current from power switch PS in a path through 1X and 1C at a rate delayed by the inductance of choke 1X. The current transferred from commutation capacitor 1C in the loop through power switch PS is opposed in polarity to the load current flowing through power switch PS and commutates the power switch off if the resultant current through power switch PS is less than its hold-in current for the required recovery period. Commutation capacitor 1C now overcharges from the energy stored in inductive motor winding FLD to a voltage of a polarity which tends to reverse bias commutation SCR 2 REC and turn it off.

Normal operation will repeat at a duty cycle controlled by the setting of speed potentiometer SPEED POT which regulates the relaxation oscillator frequency at which "on" gating pulses are supplied by the gating control 12 to power switch PS.

A peak current limit circuit PCLC monitors the voltage across commutation capacitor 1C prior to the commutation cycle and provides a variable delay signal which initiates commutation when the current to the motor exceeds a predetermined magnitude. Commutation capacitor 1C is charged during the "on" time of power switch PS by the voltage induced in transformer winding T3-T4, which voltage is proportional to the rate of change of load current flowing through power switch PS and the primary winding T1-T2 of the transformer. Consequently the voltage across commutation capacitor 1C is indicative of the magnitude of load current in the motor.

The voltage across the series arrangement of commutation capacitor 1C and choke 1X is applied to current limit circuit PCLC through a diode D1 and across a time delay circuit comprising the series arrangement of a potentiometer POT 1, a resistance R3, and a delay capacitor C2. The voltage impressed across POT 1, R3 and C2 in series is also applied to a voltage divider comprising two resistances R8 and R9 in series, and the potential at the junction of R8 and R9 is applied to the gate of a programmable unijunction transistor PUJ whose anode is coupled to delay capacitor C2. The voltage built up across delay capacitor C2 follows the slope of the charge on commutation capacitor 1C (which is a function of the magnitude of current through PS) but is delayed by the RC time constant of C2 and the combined resistance of POT 1 plus R3. The cathode of PUJ is coupled through a resistance R4 to the base of a NPN transistor Q2. When the voltage built up across delay capacitor C2 and applied to the anode of PUJ reaches the potential of its gate, programmable unijunction transistor PUJ is triggered on. Conduction by unijunction transistor PUJ couples the voltage across delay capacitor C2 through the anode-cathode circuit of PUJ and a resistance R4 to the base of transistor Q2 and forward biases Q2 into conduction. Conduction by transistor Q2, in effect, couples the voltage across commutation capacitor 1C to the gate of commutation SCR 2 REC in a path which may be traced through D1, a resistance R5, the collector-emitter circuit of Q2, and diode D2, thereby gating 2 REC into conduction to commutate power switch PS off and terminate the current pulse to the motor. Since the delay provided by the RC time constant of POT 1, R3 and C2 is fixed in current limit circuit PCLC, the output signal from circuit PCLC which gates commutation SCR 2 REC on will tend to limit the on-time of power switch PS in order to establish a stable point of operation for the chopper control.

While only a single embodiment of our invention has been illustrated and described, many modifications and variations thereof will be readily apparent to those skilled in the art, and consequently it should be understood that we do not intend to be limited to the particular embodiment shown and described.

The embodiments of the invention in which an exclusive property or privilege is claimed are defined as follows:

1. In a forced commutation chopper circuit for controlling the speed of a DC motor, the combination of
   a main SCR in series with said motor and being switchable periodically from a nonconductive to a conductive state in which it carries the load current supplied to said motor,
   commutation means connected in shunt with said main SCR for commutating said main SCR off upon command and comprising a commutation SCR poled in the same direction as said main SCR and a commutation capacitor in series with said commutation SCR,
   charging means for charging said commutation capacitor during the on-time of said main SCR to a voltage which is a function of the magnitude of the load current carried by said main SCR and in the polarity tending to forward bias said commutation SCR and reverse bias said main SCR, and current limit means operable in response to a predetermined magnitude of voltage across said commutation capacitor for gating said commutation SCR to the conductive state to thereby commutate said main SCR off.

2. In the combination of claim 1 wherein said current limit means includes time delay means for providing a selectively variable time delay between the voltage across said commutation capacitor reaching said predetermined magnitude and the gating of said commutation SCR.

3. In the combination of claim 1 wherein said chopper circuit includes means for periodically applying turn-on gating pulses to said main SCR to turn it on and for applying a turn-off gating pulse to said commutating SCR after a selectively variable time delay subsequent to each said turn-on pulse to thereby commutate said main SCR off, and wherein said current limit means is responsive to the voltage across said commutating capacitor in the interval between said turn-on and turn-off gating pulses.

4. In the combination of claim 3 wherein said means for periodically applying turn-on gating pulses includes relaxation oscillator means for selectively varying the frequency of said turn-on pulses.

* * * * *